United States Patent [19]

Fan et al.

[11] Patent Number: 5,081,637
[45] Date of Patent: Jan. 14, 1992

[54] MULTIPLE-LASER PUMP OPTICAL SYSTEM

[75] Inventors: Tso Y. Fan, Cambridge; Antonio Sanchez-Rubio, Lexington; James N. Walpole, Concord; Richard C. Williamson, Sudbury; Ivars Melngailis, Natick; James R. Leger, Groton; William C. Goltsos, Burlington, all of Mass.

[73] Assignee: Massachusetts Institute of Technology, Cambridge, Mass.

[21] Appl. No.: 443,110

[22] Filed: Nov. 28, 1989

[51] Int. Cl.⁵ .............................................. H01S 3/091
[52] U.S. Cl. ........................................ 372/72; 372/75; 372/101; 372/71
[58] Field of Search ...................... 372/69–72, 372/75, 6, 68, 101

[56] References Cited

U.S. PATENT DOCUMENTS

| | | | |
|---|---|---|---|
| 3,273,072 | 9/1966 | Koester et al. | 372/6 |
| 3,736,518 | 5/1973 | Anderson et al. | 372/75 |
| 3,890,578 | 6/1975 | Wang | 372/75 |
| 4,293,827 | 10/1981 | McAllister et al. | 331/94.5 ML |
| 4,397,525 | 8/1983 | Ahlen | 350/162.17 |
| 4,428,647 | 1/1984 | Sprague et al. | 350/167 |
| 4,689,482 | 8/1987 | Horikawa et al. | 250/205 |
| 4,701,005 | 10/1987 | Noguchi | 350/3.7 |
| 4,761,059 | 8/1988 | Yeh et al. | 350/354 |
| 4,791,631 | 12/1988 | Baumert et al. | 372/75 |
| 4,794,615 | 12/1988 | Berger et al. | 372/71 |
| 4,826,269 | 5/1989 | Streifer et al. | 350/3.72 |
| 4,901,330 | 2/1990 | Wolfram et al. | 372/71 |
| 4,905,690 | 3/1990 | Oshiro et al. | 128/395 |
| 4,922,502 | 5/1990 | Unternahrer et al. | 372/68 |

OTHER PUBLICATIONS

D. L. Begley et al., "Aperture Shared Laser Diode Array Beam Combiner", Applied Optics, vol. 27, No. 13 (1988), pp. 2685–2687.

Leger et al., "Astigmatic Wavefront Correction of a Gain-Guided Laser Diode Array Using Anamorphic Diffractive Microlenses", SPIE, vol. 884, Computer-Generated Holography II (1988), pp. 82–89.

Leger et al., "Coherent Addition of AlGaAs Lasers Using Microlenses and Diffractive Coupling", Appl. Phys. Lett. Vol. 52 (21), May 23, 1988, pp. 1771–1773.

Primary Examiner—William L. Sikes
Assistant Examiner—Susan S. Morse
Attorney, Agent, or Firm—Fish & Richardson

[57] ABSTRACT

Apparatus and method for scaling solid-state devices to higher power using multiple sources each of which are separately collimated, followed by focusing of the pump radiation into gain medium colinear to laser mode using a moderated focus. A modularized system is also described.

24 Claims, 1 Drawing Sheet

MULTIPLE-LASER PUMP OPTICAL SYSTEM

The U. S. Government has non-exclusive rights in this invention pursuant to contract number F19628-85-C-0002 awarded by the Department of the Air Force.

BACKGROUND OF THE INVENTION

The present invention relates to a method and apparatus for scaling of a laser system to higher power.

End-pumped solid-state lasers are highly efficient, high beam quality, coherent light sources. Typically, end-pumped lasers use a single diode or a single diode array light source so that the light from such source can be focused into a volume appropriate to the solid-state laser to be pumped. Use of such small scale sources is limited when scaling to high power, however, by the inability to efficiently focus more than only a few of such devices into the fundamental transverse laser mode.

Power scaling of pumping light sources may be accomplished with various techniques. For example, polarization coupling may be used in which two orthogonally polarized beams from diode lasers or diode laser arrays are combined at a polarizing beam splitter and then this combined beam is focused into the solid-state laser medium. Another technique is to use fiber bundles to bring light from many laser diodes, which can be presented in a nominally colinear manner into the solid-state laser axis, to achieve end-pumping. In any case, it is desired to increase pump power and to efficiently focus the pump beam into the gain medium for a higher power output.

Conventionally, a laser mode is defined by the optics of the optical resonator in a laser oscillator, or by the beam that is amplified in a laser amplifier.

SUMMARY OF THE INVENTION

The invention includes a method and apparatus for scaling a pumped medium to higher power. In one aspect of the invention, a system for pumping a gain medium with multiple lasers includes at least two laser light sources. The output beam of each light source is substantially collimated by respective collimating optics, and the beams of the sources are substantially parallel to each other after collimation. Also, an optical system is provided to focus the collimated and parallel beams into the gain medium such that the combined beam has a radius nearly equal to or less than the radius of the fundamental laser mode over a distance on the order of one or more pump absorption lengths of the medium. A pump absorption length is the distance required for the pump power to decrease to 1/e of its initial value.

This aspect may include any of the following features: The gain medium has an optical resonator which controls the mode radius. The pump laser light sources are preferably laser diodes or laser diode arrays. The light sources are discrete elements. The light sources are laser diodes in monolithic two-dimensional arrays. The beams from the light sources are collimated by a monolithic two-dimensional array of lenses. The beams from the light sources are collimated by individual lens elements. The collimating optics are designed to compensate for astigmatism in the pump beam. The beams from the light sources are collimated by reflection from curved mirrors. The beams from the light sources are emitted from pump lasers already collimated. The beams from the light sources are combined in a polarizing beam splitter to be colinear. The optical system contains prisms or cylindrical or spherical lenses for focusing the collimated beams. The system may further include a multimode optical fiber into which the combined beam is focused. The gain medium may be Nd:YAG, Nd:LiYF$_4$, Nd:YAlO$_3$, Nd-doped glass, Nd:YVO$_4$, Nd:BaY$_2$F$_8$, Nd:GSGG, or other Nd-doped material. The laser may operate on the $^4F_{3/2}$–$^4I_{11/2}$, the $^4F_{3/2}$–$^4I_{13/2}$, or the $^4F_{3/2}$–$^4I_{9/2}$ transitions of Nd$^{3+}$, or on the $^3H_4$–$^3H_6$ transition in Tm$^{3+}$, the $^5I_7$–$^5I_8$ transition in Ho$^{3+}$, or the $^4I_{11/2}$–$^4I_{13/2}$ transition in Er$^{3+}$, or the $^2F_{5/2}$–$^2F_{7/2}$ transition in Yb$^{3+}$. The gain medium may be end-pumped or transversely-pumped. The gain medium may be configured as an amplifier.

In another aspect of the invention, an apparatus for pumping a gain medium includes a mounting plate having a first station for attachment of a plurality of excitation modules aligned to have output beams made parallel to a common axis, and a second station for attachment of a gain medium whose length is aligned along the common axis. Each of the modules includes a laser light source and associated collimating optics. The source and optics are mounted on a single housing. For a given gain medium, an optical system is provided to focus the output beams of the modules into a beam having a radius nearly equal to or less than the radius of the laser mode over the length of the gain medium. A polarizing beam splitter may be used to combine the module outputs in a parallel beam.

In another aspect of the invention, a multiple-laser-pump system includes a plurality of excitation sources. The output of each source is substantially collimated by respective collimating optics. The beams of the sources are substantially parallel to each other. An optical system is provided to focus the substantially collimated and parallel beams to a focal volume. A plurality of optical gain media is provided, each of which is pumped by a respective multiple laser-pump. A combining structure is provided for coherently combining the output of the gain media into a single beam. The plurality of gain media may be configured as separate regions in a single monolithic structure.

In another aspect of the invention, a method for increasing power density of pumped radiation to a gain medium includes the steps of: (a) providing a plurality of laser light sources, (b) driving the sources and applying the output beam of each to respective collimating optics, (c) applying the output beam of the respective optics to a combining focusing optics, and (d) applying the combined output beam of the focusing optics to a solid-state gain medium such that the beam has a radius about equal to or less than the radius of the laser mode over the length of the medium. Step (d) preferably includes selection of a moderated focal length where neither the size contribution of the spreading angle of a single beam nor partial overlap of the collimated beams dominates the size of the combined output beam in the gain medium.

In another aspect of the invention, a system for coupling light into an optical fiber includes at least two laser light sources, each light source being configured such that each respective output beam is substantially collimated by respective collimating optics, with the beams being substantially parallel to each other after collimation, and an optical system configured to focus the collimated and parallel beams into a fiber such that the combined beam has a radius nearly equal to or less than the radius of the fiber and a convergence angle nearly equal to or less than the acceptance angle of the optical fiber.

DETAILED DESCRIPTION OF THE PREFERRED EMBODIMENT

First we briefly describe the drawings.

Figure 1:
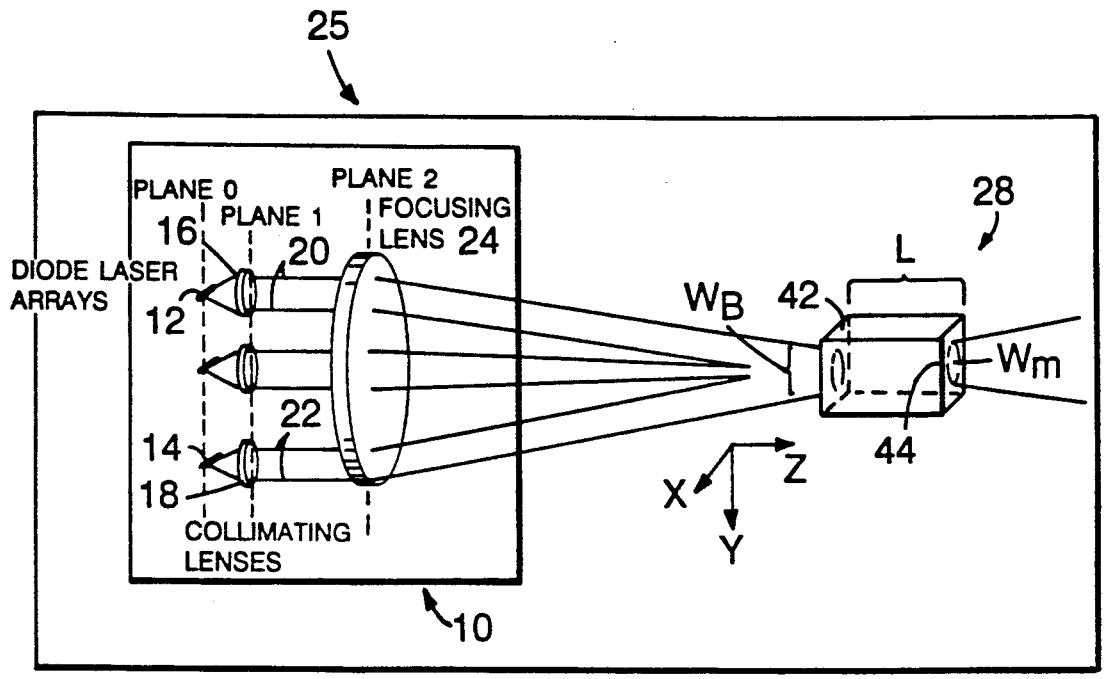
FIG. 1 is a schematic representation of a gain medium pumped with a multiple-laser pump in practice of the invention.

FIG. 1 shows a multiple-laser-pumped solid-state system 25 in which a multiple-laser pump 10 pumps a gain medium 28. Pump 10 includes a plurality of laser light sources 12, 14 (such as diode lasers or diode laser arrays) in a first plane 0. Each output beam 20, 22 of source 12, 14, respectively, is applied, via respective collimating devices 16, 18, (such as lenses) in a second plane 1 to a focusing assembly 24 in a third plane 2 in order to converge the beams into gain medium 28.

Light sources 12, 14, are separately collimated. After beam collimation, another lens, or set of lenses, or other optics, is used to focus the pump beam into the gain medium. The difference between this technique and using a single lens for collimation of all the sources is that in the latter case, the pump lasers are treated as a single, incoherent, extended source, whereas in the former case, the brightness of each light source is maintained while the source outputs are combined to increase the total pump power.

We have found that to increase the power from the pump source so as to obtain a higher power output from the pumped laser or amplifier, the emitting area of the diode/diode array must be increased, and this extended beam area then must be focused efficiently into the gain media. The present invention enables such higher power pump beams to efficiently pump gain media to higher power.

We have recognized that if an end pumped gain medium has a length L (which for a given crystal is chosen so that the crystal will absorb a given fraction of incident pump radiation) and a mode with radius $\omega_m$ (normally determined by the optical resonator), maximum utilization of the pump beam energy will be obtained if the pump beam has a radius $\omega_B$ which is about equal to or preferably slightly smaller than radius $\omega_m$ over a distance on the order of one or more pump absorption lengths of the gain medium. Therefore, for maximum efficiency in scaling to higher power (i.e., increasing the number of light sources in the x and y direction and efficiently capturing their energy for pumping a given gain medium), beam radius $\omega_B$ must be minimized down to the constraint of radius $\omega_m$ (over length L). Preferably such optimization is performed by optimally choosing the focusing optics.

We have also recognized the importance of two major factors which effect pump beam size in the gain medium. The first factor is that each collimated light source will have a spreading angle. The second factor is that the collimated beams of multiple sources normally only partially overlap at the input and output faces (although overlapped at the center) of the medium. The contribution of the first factor to the pump beam size is minimized by decreasing the focal length of the focusing optics, while the contribution of the second factor (partial overlap) is minimized (overlap is increased) by increasing the focal length. Hence, focusing optimization is achieved on a case by case basis by selecting a moderated focal length where the contribution of neither of these factors dominates.

Figure 2:
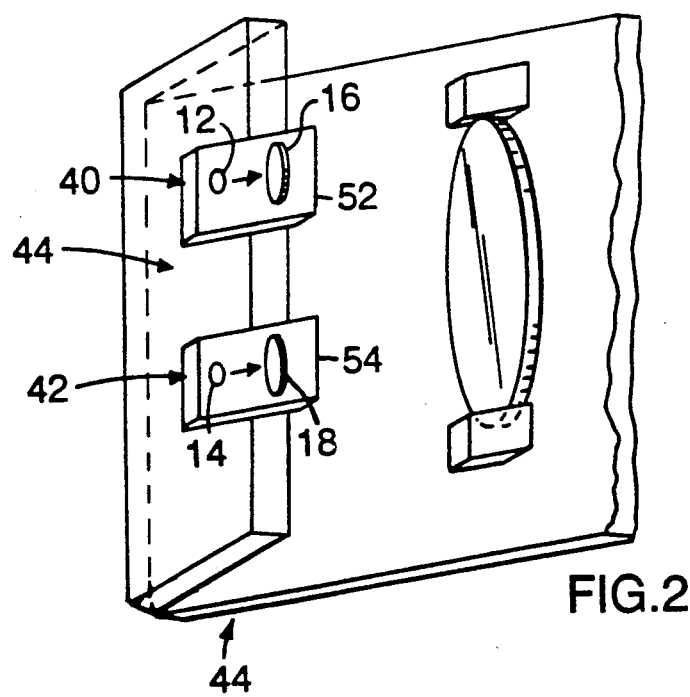
FIG. 2 is a schematic representation of a modularized multiple-laser pump in practice of the invention.

The position of the diode laser or diode laser array relative to the collimating lens is of importance and effects both the degree of collimation and the pointing of the collimated beam into the focal element. As shown in FIG. 2, we provide modules 40, 42 in order to assure uniform collimation of the outputs of light sources 12, 14. Each of these modules includes a diode laser or a diode laser array 12, 14 prealigned with a collimating lens (or lenses) 16, 18 in a single package 52, 54, and can be attached to a reference plate 44 to assure accurate alignment of the modules relative to each other and to the focal optics. This avoids the difficulty of trying to align many diodes with many collimating lenses, and of aligning these combinations into the focal optics.

After collimation, and before the focal system, all the beams should be substantially parallel and the far field diffraction angle should be adjusted to a minimum. Then, after focusing, the far field angle (as well as beam overlap) is adjusted as discussed above to achieve a moderated focus.

In one power scaling experiment, three 500 mW linear diode laser arrays, available from Spectra-Diode Laboratories as model number SDL-2430, were used to pump a single Nd:YAG laser operated in the fundamental transverse mode. The SDL-2430 is a ten stripe array, each stripe being 6$\mu$ wide and spaced 10$\mu$ apart center to center, and with an array output wavelength of 810 nm. The beam output of these arrays is diffraction-limited in the y-direction.

The product of the radius $\omega$ of the pump beam at a given plane and its far field diffraction angle $\Theta$, in a medium having index of refraction n, is expressed by the equivalency $\omega_{qy}\Theta_{qy}n=\lambda/\pi$ for a diffraction limited beam. The subscript qy (or qx) indicates a quantity at the qth plane in the y (or x) direction. $\lambda$ is the wavelength of the array output.

We can use this equivalency to compare the array output beam in the x and y directions. The product of $\omega\Theta n$ for the 2430 array is calculated to be approximately $7.5\times10^{-4}$ cm in the x direction and approximately $2.6\times10^{-5}$ cm in the y direction (where n=1). Hence, the limiting factor in focusing the beam from the SDL-2430 array into an end-pumped laser is the beam quality (i.e., the $\omega\Theta$ product) in the x-direction.

In our experiment, with the three arrays spaced one centimeter apart in the y-direction, the beams are collimated such that, in the plane of the collimating lenses, $\omega_{1y}$ is calculated at 0.15 cm, and by brightness conservation, $\Theta_{1y}$ is calculated at $1.7\times10^{-4}$ rad. But the three collimated pump beams (one from each array) can be treated as one large pump beam with radius $\omega'$ and divergence $\Theta'$. Hence, in this case, in the non-diffraction-limited x-direction, $\omega_{1x}=\omega'_{1x}$, $\Theta_{1x}=\Theta'_{1x}$, and $\omega'_{1x}\Theta'_{1x}=7.5\times10^{-4}$ cm; but in the y-direction, $\Theta_{1y}=\Theta'_{1y}$, and $\omega'_{1y}$ is calculated at 1.15 cm, and so $\omega'_{1y}\Theta'_{1y}$ is about $2\times10^{-4}$ cm. With three diodes only we still have $\omega'_{1y}\Theta'_{1y}<\omega'_{1x}\Theta'_{1x}$; thus, in this experiment, we are able to go further and align a total of 10 diode arrays in the y-direction before the brightness in this direction is about equivalent to that in the x-direction.

We prefer to use off-the-shelf light sources for scaling. Generally, we choose the larger $\omega\Theta$ product direction (the x direction in the above experiment) as a target dimension, and then we build the narrower direction (y)

up to the target dimension (such as by adding additional arrays in that narrower direction) to generate a beam which optimally fills the gain medium mode profile (e.g., by forming a round cross-section beam to fill a round cross-section laser mode), while at the same time we adjust the focal optics to achieve a moderated focal length (to optimally fill the mode volume). In this manner, we can efficiently scale a system to higher power (i.e., by increasing the number of inexpensive—off-the-shelf—light sources) with the focused beam radius $\omega_B$ maintained about equal to or preferably smaller than the gain medium radius $\omega_m$ over the medium length L to optimize our pumping.

If the above constraints are observed, a practical benefit in scaling occurs. The area increase in the light source (e.g., by increasing the number of light sources in the x and/or y direction) requires only a square root increase in the laser mode cross-sectional area. Thus, pump power per unit area at the gain medium increases with scaling. Such higher gain is of particular benefit for scaling low gain media.

In the foregoing experiment, we used 0.4 cm focal length lenses to collimate the beams from the individual arrays. In focusing the collimated beams into the gain medium, a 15 cm focal length cylindrical lens was used to focus the pump beam in the plane that is perpendicular to the junction of the arrays. This provided near optimum focusing (as described above); $\omega_B$ was slightly smaller than $\omega_m$ which was ~220 $\mu$m over the 0.7 cm length of the gain medium (Nd:YAG). In the orthogonal plane (plane of the junction) a 3.8 cm focal length cylindrical lens was used to focus the beam to a spot smaller than $\omega_m$ over the length of the gain medium.

Just as the present invention permits scaling of light sources into a gain medium, it also facilitates scaling of the output power of a multiplicity of end-pumped solid-state lasers by coherent combining.

Lasers which may be used in practice of the invention may include, but are not limited to, for example, lasers operating on the $^4F_{3/2}$–$^4I_{11/2}$, the $^4F_{3/2}$–$^4I_{13/2}$, or the $^4F_{3/2}$–$^4I_{9/2}$ transitions of $Nd^{3+}$ or on the $^3H_4$–$^3H_6$ transition in $Tm^{3+}$, the $^5I_7$–$^5I_8$ transition in $Ho^{3+}$, or the $^4I_{11/2}$–$^4I_{13/2}$ transition in $Er^{3+}$. This technique is particularly useful for pumping of solid-state lasers that require high pump intensity, for example, the $^4F_{3/2}$–$^4I_{9/2}$ $Nd^{3+}$, $^5I_7$–$^5I_8$ $Ho^{3+}$, the 2 $\mu$m $^3H_4$–$^3H_6$ $Tm^{3+}$ and the $^4I_{11/2}$–$^4I_{13/2}$ $Er^{3+}$ transitions.

The present invention may also be applied to transversely pumped gain media. Transverse pumping is achieved by applying the pump output orthogonally to the direction of the output beam. As a result, focusing is mainly required in one direction only. This can be achieved, for example, with a cylindrical collimating and focusing lens. If high pump fluence is still needed, 2-d focusing may be used.

In practice of the present invention, it is now possible to use multiple laser pumps with gain media for various results. It may be used to produce higher power diode-pumped solid-state lasers, such as a three micron Er: LiYF$_4$ laser for medical applications. A diode-pumped, Q switched Nd:YAG laser can also be produced with higher pulse energies, usable for remote sensing (range finding, etc.), as well as link blowing in semiconductor fabrication, for example. The invention might also enable production of a two micron holmium or thulium (safe to the eye) laser for coherent laser radar for airborne wind detection. Other possibilities abound.

The gain media may be Nd:YAG, Nd:LiYF$_4$, Nd:YAlO$_3$, Nd-doped glass, Nd:YVO$_4$, or other Nd-doped material, for example. Other materials may also be used.

The present invention can also be used to efficiently couple light from many lasers into an optical fiber. These fibers can be characterized by the fiber core radius and an acceptance angle (given by the numerical aperture of the fiber for the input radiation). If the $\omega\Theta$ product of the pump beam from the multiple laser source is on the order of or less than the product of the radius and acceptance angle of the fiber, then it is possible to couple the pump beam efficiently into the fiber.

Furthermore, we can optimize the focusing of the pump beam into the fiber. At the fiber entrance the spot should be on the order of or smaller than the core size and the convergence angle should be on the order of or smaller than the acceptance angle of the fiber for efficient coupling. The output of the fiber can then be used to either pump a gain medium or for other applications that require high power from the output of a fiber.

The present invention is not limited to a particular optical package or configuration. There may be various optics either before or after the collimating lens or before or after the focusing lens (or lenses) for additional beam shaping or for adjustment of beam pointing. For example, the pump beam at plane 1 of FIG. 1 is long in the y-direction and narrow in the x-direction. It may be desirable to focus this beam into the gain medium with cylindrical lenses or to have a prism pair before the focusing lens to equalize the beam dimensions. Also, the beam pointing of each collimated diode array could be adjusted with Risley prisms, for example.

Other embodiments are within the following claims.

We claim:

1. A system for pumping a gain medium with multiple lasers comprising:
   a multi-beam laser light source for generating more than one collimated output beam, said collimated output beams being substantially parallel to each other; and
   an optical system configured to focus the parallel collimated output beams into the gain medium to form a pump beam having a radius that is nearly equal to or less than a preselected value over a region that is on the order of one or more pump absorption lengths long, wherein the size of the pump beam within the region is characterized by a first contribution due to beam overlap of the focused beams and a second contribution due to spreading angle of a single beam and wherein the size of said pump beam at the either end of said region is dominated by neither the first nor second contributions.

2. The system of claim 1 wherein said optical system is configured to focus the collimated beams into the gain medium so as to end-pump the gain medium.

3. The system of claim 1 wherein said preselected value is nearly equal to or less than the radius of the fundamental laser mode in the medium.

4. The system of claim 3 wherein said multi-beam light source comprises:
   at least two laser elements, each laser element being configured to emit an output beam, and
   an optical array including for each of said laser elements a corresponding optical element for collimating the output beam from that laser element to produce a corresponding one of said collimated output beams.

5. The system of claim 4 further comprising an optical resonator to control the mode radius.

6. The system of claim 4 wherein the laser elements are laser diodes, or laser diode arrays.

7. The system of claim 6 wherein the laser elements are discrete elements.

8. The system of claim 4 wherein the laser elements are laser diodes in monolithic two-dimensional arrays.

9. The system of claim 4 wherein said optical array is a monolithic two-dimensional array of lenses.

10. The system of claim 4 wherein the optical elements of said optical array are individual lens elements within said optical array.

11. The system of claim 4 wherein the optical system contains prisms, or cylindrical or spherical lenses for focusing the collimated beams.

12. The system of claim 4 wherein the gain medium is Nd:YAG, Nd:LiYF$_4$, Nd:YAlO$_3$, Nd-doped glass, Nd:YVO$_4$, Nd:BaY$_2$F$_8$, Nd:GSGG, or other Nd-doped material.

13. The system of claim 4 wherein the gain medium operates on the $^4F_{3/2}$–$^4I_{11/2}$, the $^4F_{3/2}$–$^4I_{13/2}$, or the $^4F_{3/2}$–$^4I_{9/2}$ transitions of Nd$^{3+}$.

14. The system of claim 4 wherein the gain medium operates on the $^3H_4$–$^3H_6$ transition in Tm$^{+3}$, the $^5I_7$–$^5I_8$ transition in Ho$^{+3}$, the $^4I_{11/2}$–$^4I_{13/2}$ transition in Er$^{+3}$, or the $^2F_{5/2}$–$^2F_{7/2}$ transition in Yb$^{+3}$.

15. The system of claim 4 wherein the gain medium is configured as an amplifier.

16. The system of claim 4 wherein the collimating optics compensate for astigmatism in the beams from the light sources.

17. A method for pumping a gain medium, comprising the steps of:
  (a) generating a plurality of output light beams,
  (b) collimating each of the plurality of output light beams to produce a plurality of substantially parallel beams,
  (c) focusing the substantially parallel output beams to produce a combined output beam, and
  (d) pumping a solid-state gain medium with said combined output beam, wherein said combined output beam has a radius that is nearly equal to or less than a preselected value over a region that is on the order of one or more pump absorption lengths long, wherein the size of the pump beam within said region is characterized by a first contribution due to beam overlap of the focused beams and a second contribution due to spreading angle of a single beam and wherein the size of said pump beam at either end of said region is dominated by neither the first nor second contributions.

18. A system for coupling light into an optical fiber comprising
  a multi-beam laser light source for generating more than one collimated output beam, said collimated output beams being substantially parallel to each other; and
  an optical system configured to focus the collimated and parallel output beams into the fiber such that the combined beam has a radius nearly equal to or less than the radius of the fiber and a convergence angle that is nearly equal to or less than the acceptance angle of the fiber, and such that the product of the far field divergence angle of the combined beam and the radius of the combined beam at the point at which the combined beam would enter the fiber is on the order of or less than the product of the radius of the fiber and the acceptance angle of the fiber.

19. The system of claim 18 wherein said laser light source comprises
  at least two laser elements, each laser element being configured to emit an output beam, and
  an optical array including for each of said laser elements a corresponding optical element for collimating the output beam from that laser element to produce a corresponding one of said collimated output beams.

20. The system of claim 18 wherein said laser light source comprises
  at least two laser elements each laser element being configured to emit an output beam, and
  an optical array including for each of said laser elements a corresponding optical element for collimating the output beam from that laser element to produce a corresponding one of said collimated output beams.

21. A laser pump system comprising:
  a gain medium;
  a multi-beam laser light source for generating more than one collimated output beam, said collimated output beams being substantially parallel to each other; and
  an optical system configured to focus the parallel collimated output beams into said gain medium to form a pump beam having a radius that is nearly equal to or less than a preselected value over a region that is on the order of one or more pump absorption lengths long, wherein the size of the pump beam within the region is characterized by a first contribution due to beam overlap of the focused beams and a second contribution due to spreading angle of a single beam and wherein the size of said pump beam at either end of said region are dominated by neither the first nor second contributions.

22. The system of claim 21 wherein said optical system is configured to focus the collimated beams into the gain medium so as to end-pump the gain medium.

23. The system of claim 21 wherein said preselected value is nearly equal to or less than the radius of the fundamental laser mode in the medium.

24. The system of claim 23 wherein said multi-beam light source comprises:
  at least two laser elements, each laser element being configured to emit an output beam, and
  an optical array including for each of said laser elements a corresponding optical element for collimating the output beam from that laser element to produce a corresponding one of said collimated output beams.

* * * * *